March 19, 1968  R. N. NELSEN  3,373,485
METHOD OF PRODUCING A ROTOR AND SHAFT ASSEMBLY
Original Filed Dec. 16, 1963
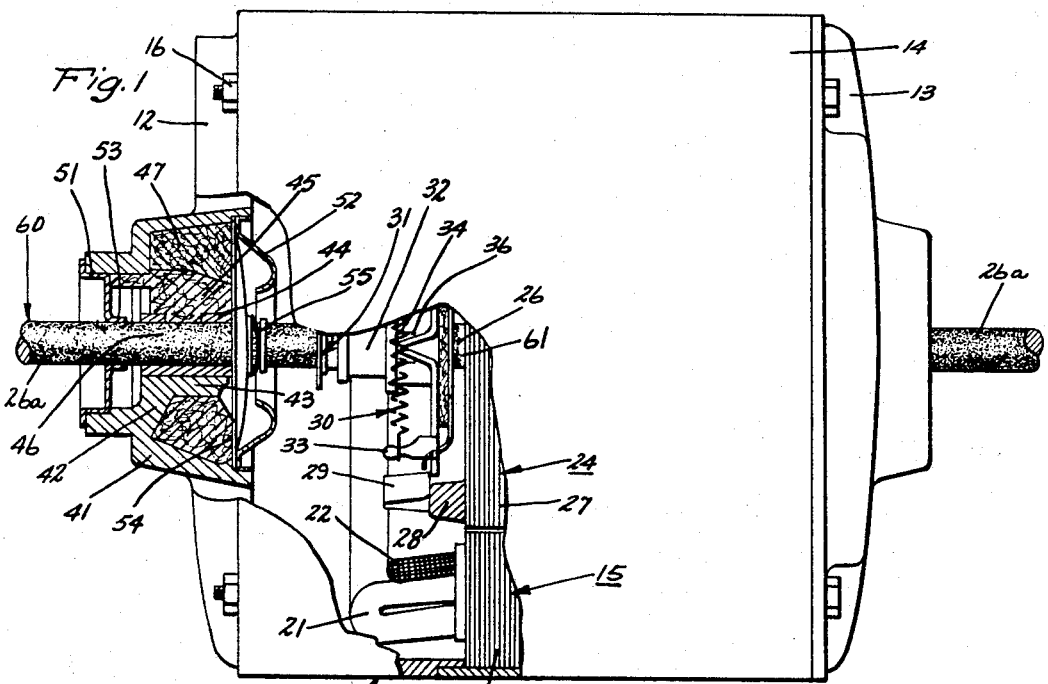
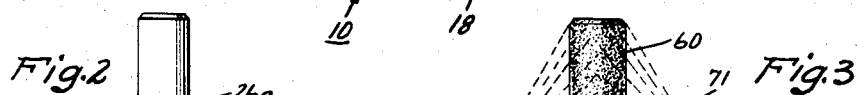
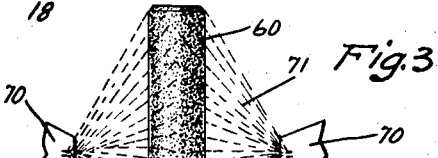
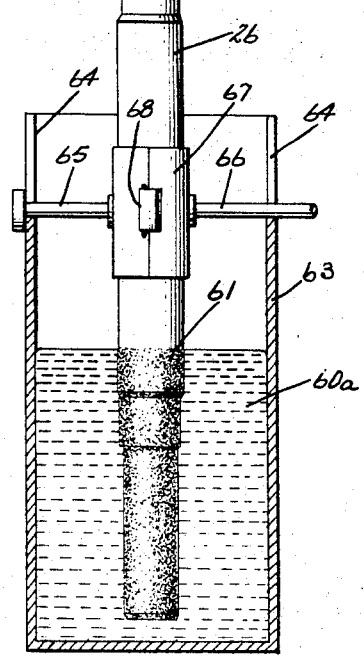
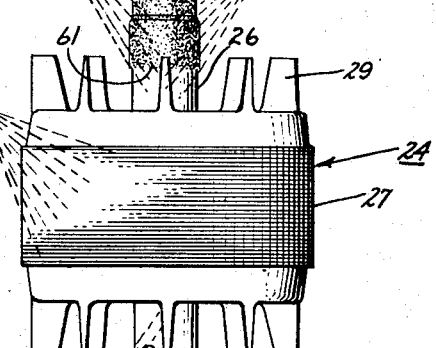
INVENTOR.
Ronald N. Nelsen,
BY John M. Stoudt
Attorney.

United States Patent Office 3,373,485
Patented Mar. 19, 1968

3,373,485
METHOD OF PRODUCING A ROTOR AND SHAFT ASSEMBLY
Ronald N. Nelsen, De Kalb, Ill., assignor to General Electric Company, a corporation of New York
Original application Dec. 16, 1963, Ser. No. 330,677, now Patent No. 3,293,458, dated Dec. 20, 1966. Divided and this application Sept. 13, 1965, Ser. No. 486,806
4 Claims. (Cl. 29—598)

This is a division application of my co-pending application Ser. No. 330,677 filed on Dec. 16, 1963, now Patent No. 3,293,458. The present invention relates in general to dynamoelectric machines and more particularly to an improvement in the method of producing a rotor and shaft assembly for such machines.

In certain dynamoelectric machine applications, such as domestic washing machines, clothes dryers and motor driven pumps, fractional horsepower motors are used in connection with moisture laden environments where the moisture comes into contact with certain exposed components of the motor. If these motor parts are not properly protected from the moisture they tend to become deleteriously affected. The motor shaft, normally fabricated from steel, is one of these parts which is particularly susceptible to injury from contact with moisture and is difficult to preserve the quality of the finish on the outer shaft surface. The quality of the shaft outer surface at the journal surfaces where it is rotatably supported is important and is especially critical at its output end which projects beyond the confines of the motor housing to drive the domestic appliance or other piece of equipment.

In an attempt to prevent the shaft from becoming rusted, corroded or otherwise damaged from the moisture laden environment, several approaches have been suggested and tried in the past but none have been entirely satisfactory for one reason or another. For example, in one approach, the steel shaft, prior to assembly with the rotor core, is placed into a suitable electrolytic bath and plated with a film of chrome. The chrome plating approach, however, is not only relatively expensive to practice, but also the uniformity of the chrome film applied to the outer surface of the shaft is difficult to control with any degree of accuracy. This lack of control, in turn results in the tendency of the film to be uneven in thickness at the journal surfaces of the shaft causing an interference with the proper rotation of the shaft in the bearings.

Another technique is the one in which a coating known in the art as black oxide is formed over the entire shaft surface prior to its assembly with the rotor core by a so-called hot dip chemical process utilizing nickel penetrate salts or the like. Although this technique is less expensive than the chrome film approach, it too has certain deficiencies. For instance, the black oxide film increases the journal friction experienced between the journal surface of the shaft and the bearing bore. In addition, after a period of time the black oxide begins to deteriorate, ultimately exposing to the humidity the parts of the shaft sought to be protected. Furthermore, for those motors incorporating centrifugal devices, such as that disclosed in the Welch Patent No. 2,149,108, in which a collar moves axially on the shaft in response to speed of rotation to actuate a switch for deenergizing certain motor windings, the black oxide interferes with the freedom of collar movement on the shaft.

Accordingly, it is a general object of the present invention to provide an improved method of producing a rotor and shaft assembly and it is a more specific object to provide a construction and its method of manufacture which overcome the shortcomings and deficiencies in the past approaches mentioned above.

It is another object of the present invention to provide an improved method of forming a continuous coating of uniform thickness on an article of manufacture such as a dynamoelectric machine shaft which has low friction characteristics, is resistant or impervious to moisture and is inexpensive to produce.

It is yet another object of this invention to provide an inexpensive method of fabricating a shaft for use in dynamoelectric machines which is satisfactorily and adequately protected from moisture for the operative life of the machine, the shaft including low friction qualities at its journal surfaces which compare favorably with those of standard, highly finished, plain or untreated steel shafts.

In carrying out the objects of the present invention in one form thereof, I form a relatively thin and continuous, imperforate adherent film composed of magnesium hydroxide or of magnesium hydroxide in combination with magnesium bicarbonate, over preselected portions of a dynamoelectric machine shaft, such as the output end of the shaft which is adapted to extend beyond the confines of the machine. Preferably, this film which is substantially uniform in cross-section, extends over the shaft journals into the interior of the machine, terminating adjacent the side face of the rotor. This film protects the exposed parts of the shaft from corrosion or oxidation which would normally result from a moisture laden environment. In addition, the film furnishes a surface having low friction characteristics, and as such, enhances the rotation of the shaft in the bearings during operation of the machine.

The preselected portion of the shaft to be treated is lowered into a solution of magnesium methylate having dissolved carbon dioxide in it after impurities, moisture and foreign matter have been removed from its exterior. The shaft is withdrawn from the solution at a rate of between 2–4 feet per minute in order to produce a film over the desired region with the proper thickness and uniformity characteristics, the film being temporarily composed of magnesium methylate, magnesium hydroxide, and magnesium bicarbonate which ultimately react under atmospheric conditions to form a hardened adherent, continuous film of magnesium hydroxide. Thereafter a finished rotor in preheated condition is slid over the shaft to a central position on the shaft and the size of the rotor bore is reduced to furnish an interference fit between the shaft and the core while the temperature of the film is maintained below the temperature at which it would otherwise be formed into magnesium oxide, that is, below a temperature of 350° C.

The subject matter which I regard as my invention is particularly pointed out and distinctly claimed in the concluding portion of this specification. My invention, itself, however, both as to its organization and method of operation, together with further objects and advantages thereof may best be understood by reference to the following description taken in connection with the accompanying drawing.

In the drawing:

FIGURE 1 is a side elevational view of a dynamoelectric machine, partly broken away at one end, incorporating the preferred form of my invention;

FIGURE 2 is a view, partly in full and partly in section, of a coating being applied to the machine shaft seen in FIGURE 1; and FIGURE 3 is a side view, partially broken away to show detail, of the shaft and rotor of FIGURE 1 being assembled.

Referring now to the drawing in more detail, and in particular to FIGURE 1, the preferred embodiment of my invention, for purposes of disclosure, is illustrated as being incorporated in a dynamoelectric machine 10 especially suitable for use in appliances such as washers, dryers, dishwashers and the like where there is a moisture laden environment. More specifically, machine 10 of the exemplification is a single phase split phase alternating current induction motor 10 of the so-called double output shaft type adapted to drive a pump or other piece of equipment (not shown) with one shaft extension and a fan or the like with the other extension. The illustrated motor includes a standard stationary frame formed by a pair of similar generally imperforate end shields 12, 13, and a central shell 14 which surrounds and supports a stator 15 of conventional construction. A number of through-bolts 16 are used to hold the stator and frame components together. The stator has a laminated magnetic core 18 carrying a primary or main winding 21 and an auxiliary or start winding 22 in the usual way, that is, electrically displaced one from the other.

A rotatable secondary member or rotor 24 is arranged to cooperate electrodynamically with stator 15 and is mounted on a steel shaft 26 to form a rotatable assembly which is supported for revolution by frame 12. Rotor 24 is of the squirrel-cage induction type and conventionally includes a laminated secondary magnetic core 27 carrying a permanently short-circuited winding 28 having an end ring 29 disposed on either side face of the secondary core. In the exemplification, winding 28 is made of cast material, such as aluminum, and is furnished with a number of angularly spaced apart cast radial fan blades 31 extending axially away from each ring 29 for circulating air around the interior of the motor for cooling purposes.

In motor 10 of the exemplification, shaft 26 accommodates a speed responsive centrifugal mechanism, generally indicated at 30, carried adjacent one end of the rotor for operating a start winding controlling mechanism 31, both mechanisms being of the kind disclosed in the aforementioned Welch patent. As outlined by Welch in his patent, the centrifugal mechanism includes a push collar 32 which is adapted to be slid axially on the shaft in response to the centrifugal action of weights 33 which overcome the bias of springs 34 connected thereto. When the desired critical operating speed is attained, above which the start winding is not needed, weights 33 move outwardly against the bias of the springs and by virtue of connection 36 move collar 32 away from the rotor to actuate switch mechanism 31. This, in turn, allows the contacts of the switch to be open circuited. FIGURE 1 shows mechanism 30 during operating conditions of motor 10, with the start winding deenergized. Below the critical speed, springs 34 will force push collar 32 toward the rotor along the shaft and the contacts of switch mechanism 31 will again be closed.

The rotatable support by the motor frame of shaft 26, and consequently of mechanism 30 and rotor 24, is clearly revealed in FIGURE 1. Although only end shield 12 has been broken away to show details of such support and the following description has reference to that end shield, it will be understood that for purposes of disclosure, a similar arrangement may be incorporated in end shield 13. More specifically, end shield 12, fabricated of suitable cast material, has a central hub section forming an enclosed bearing housing 41 furnished with integral spiders 42 which terminate in a central tubular section 43 mounting a standard sleeve bearing 44 which provides the rotatable support for journal surface 46 of shaft 26. Bearing housing 41 contains a felt pad 47 of cylindrical construction for holding or storing lubricant and a wick 48, communicating between pad 47 and journal surface 46, feeds lubricant to the shaft. Housing 41 is closed at each end by outer and inner cup members 51 and 52, each having an interference fit with housing 41 and formed with a central opening to permit shaft extension or output end 26a to project beyond the confines of the motor frame. Flange 53 of outer cup 51 is employed as a seal means around shaft extension 26a. Cooperating stationary and rotatable thrust bearing elements 54 and 55 of conventional design provide the control of axial movement of rotor 24 in the usual way.

By an important aspect of the present invention, I form an adherent, relatively thin and continuous hardened film 60 composed of magnesium hydroxide, $Mg(OH)_2$, or of magnesium hydroxide in combination with magnesium bicarbonate, $Mg(HCO_3)_2$, on at least the part of the shaft which may be exposed to a moisture laden environment; e.g., shaft extension 26a connected in driving relation to the driven device. As used hereinafter, magnesium hydroxide film 60 has reference to a film having either of the foregoing compositions. For reasons which will now be explained, in the preferred embodiment I form the imperforate film 60 over the entire output end of that shaft, that is, enveloping shaft extension 26a, with the film extending entirely through the end shield and the bearing into the motor interior. Preferably, film 60 terminates adjacent the side face of rotor core 27, the point indicated at 61 in the drawing.

Magnesium hydroxide film 60, when properly formed, is not only hard and has a glossy appearance, but also is substantially uniform in thickness throughout its axial length. The film serves to protect the shaft from the deleterious effect (e.g., oxidation) normally resulting from exposure to moisture. In addition, as will be shown later, due to its hardness, uniformity, smoothness, and thinness, it forms an excellent low friction adherent layer over the journals 46 of the shaft for protecting these surfaces from oxidation while furnishing enhanced relative rotation between the shaft and the bearings.

I have determined in actual practice that to achieve the foregoing properties and advantages, the film should not be substantially greater than one mil in thickness and for best results should be less than one mil. For example, I have found that a film approximately 2000 angstroms in thickness is very desirable and satisfactory in both the protection of the shaft and low friction characteristics without any indication whatsoever of deterioration over extended periods of time below motor operating temperatures of 350° centigrade. Film 60 also has excellent flexibility and adhesion properties, and adheres well to such materials as aluminum, iron, copper and the like as well as the plain steel shaft of the exemplification.

The following table is a tabulation comparing the typical shaft-bearing friction characteristics of motors having shafts constructed in the manner of the preferred embodiments with those incorporating either plain uncoated steel shafts or steel shafts with black oxide:

| Tested motors | Coefficient of friction, $\mu$, at break away (zero) speed, with no previous run-in | $\mu$ at break away (zero) speed after a 20 minute run-in | $\mu$ at a running speed of 1,800 r.p.m. after a 20 min. run-in |
| --- | --- | --- | --- |
| Shaft having magnesium hydroxide film 60 | .14 | .18 | .02 |
| Plain steel shaft | .17 | .23 | .02 |
| Black oxide coated shaft | .31 | .21 | .05 |

The above tabulated coefficient of friction values are based upon and represent the average results of approximately 20 motors tested with the shafts of each category. It will be observed from the table that a motor incorporating the present invention includes excellent journal friction characteristics at initial and subsequent breakaway speeds as well as operating conditions.

With film 60 extending up the side face of the rotor on the side of the motor having the centrifugal mechanism, if one is used, both the journal surfaces of the bearings and the push collar can take full advantage of the low frictional qualities of the film. This construction has the additional feature of protecting the covered shaft surfaces from the adverse affects of moisture or the like within the confines of the motor frame.

The magnesium hydroxide film 60 is formed on shaft 26, after the shaft has been machined to the requisite toleranced dimensions and provided with finished journal surfaces 46, and after it has been thoroughly cleaned. Impurities, moisture and foreign matter may be removed from the regions to be coated by any suitable means. A conventional trichloroethylene vapor degreaser procedure or the immersion of the shaft in acetone may be employed for such purpose. With the shaft in a clean condition, I prefer to dip or immerse the output end of the shaft, prior to its assembly with the rotor core for reasons of ease in handling, into an alcoholic solution of magnesium methylate, indicated at 60a in FIGURE 2, held by an open ended container 63. This solution may be of the type disclosed in my Patent 2,939,808 issued June 7, 1960, and preferably contains approximately 3.5% magnesium methylate by weight.

Magnesium methylate solution in methal is commercially available from many sources, and before use, should be carbonated by bubbling carbon dioxide ($CO_2$) through it to dissolve any precipitated $Mg(OH)_2$ that might be present and to prevent the formation of additional $Mg(OH)_2$. Thus, solution 60a when ready for use will contain magnesium methylate and magnesium bicarbonate dissolved in methanol, $(CH_3O)_2$. In addition, in all probability, some $CO_2$ will be dissolved in the methanol as well as a slight amount of carbonic acid, $H_2CO_3$.

Although the rate of immersion of shaft 26 into solution 60a is not particularly important, the withdrawal rate should be in the range of 2 to 4 feet per minute when coating the shaft at room temperature conditions in order to control and achieve the proper film thickness and uniformity of cross-section throughout its length. For instance, I have discovered by experimentation that a withdrawal rate below two feet per minute produces extremely thin coatings, far less than 1000 angstroms, which do not provide the most beneficial type of corrosion protection for the shaft. On the other hand, a withdrawal rate greater than four feet per minute creates non-uniformity in thickness in the applied coating and a heavy non-adhering region near the lower end of the shaft. This detrimentally affects the low friction characteristics which are possible when the coating has the proper uniformity, adherence and thickness properties.

Still referring to FIGURE 2, in order to immerse the shaft into solution 60a and withdraw it at a steady rate of travel within the desired rate limits, the container 63 may be formed with a pair of opposed slots 64 for accommodating extensions 65 and 66 of a suitable shaft holding device 67. As illustrated, device 67 is mounted centrally on shaft 26 and is formed in two curve sections which pivot around hinge 68 and clamp together remote from the hinge. Any suitable means (not shown) attached to extension 66 may be utilized to transport the shaft and holder upwardly away from solution 60a with the requisite speed or motion.

Upon exposure of the coated shaft to the ambient of the room, the methanol in the coating solution on the shaft will evaporate, removing the dissolved carbon dioxide with it, and the magnesium methylate will react rapidly with the water vapor in the air to produce a magnesium hydroxide product. In addition, it is believed that a small amount of magnesium bicarbonate will be deposited on the shaft which in turn will slowly react to form magnesium carbonate. The carbonic acid, being unstaple, will decompose to form water and carbon dioxide, both passing into the air as gases. Consequently, the freshly deposited film coating will be composed of magnesium methylate, magnesium hydroxide, and magnesium bicarbonate. After approximately six minutes under room conditions, all volatile matter will have reacted or converted to form the adherent, hardened film 60 composed principally of magnesium hydroxide, or magnesium hydroxide in combination with magnesium bicarbonate. The ratio of these two compounds in the final coating will be affected by the amount of moisture picked up by solution 60a before it is applied to the shaft. In addition, a small amount of magnesium carbonate may be present, the amount slightly increasing over a period of time. During these six minutes, the coated portion of the shaft should not be handled or touched so that the smooth imperforate film exterior will not be damaged.

When a film is to be formed on the other end of shaft 26, this may readily be accomplished by merely reversing the shaft 26 and holder 67 and the film applying steps just outlined are repeated. If the shaft is to be stored for any length of time before assembly with rotor core 27, it may be desirable to dip the entire shaft in a rust preventive oil, such as Stanorust 42, which will also cover any untreated sections of the shaft.

To assemble core 27 and shaft 26 together the core, preheated to increase the normal size of the bore, may be slid over the shaft, including film 60, and held centrally on the shaft between the film terminations 61 (see FIGURE 3). During this assembly procedure, it is extremely important to maintain the temperature of the shaft and film 60 continuously below the temperature at which film 60 would convert to magnesium oxide, MgO. This may be done by any suitable arrangement, such as that illustrated in FIGURE 3. For example a number of nozzles 70, connected to a supply of coolant such as water may direct a flow of water 71 onto the hardened film 60 immediately after the core has been positioned on the shaft. This not only serves to maintain the film below the critical temperature limit, but also removes heat from the core to lower its temperature which in turn causes a reduction of the bore to produce an interference fit between the core 27 and shaft 26.

It will be recognized from the foregoing that by the present invention, motor shafts may be conveniently and inexpensively protected from the adverse affects of moisture laden environments and finished assemblies produced by my invention may be readily stored before use without experiencing corrosion and the like at the journals thereof when they contain the magnesium hydroxide film. At the same time, under these latter conditions, the shaft is provided with low friction journals which enhance the rotation of the shaft in the motor bearings during operation. Moreover, for motors incorporating centrifugal devices, relatively unimpeded axial movement of the collars of such devices is insured.

While in accordance with the Patent Statutes, I have described what at present is considered to be the preferred embodiment of my invention, it will be obvious to those skilled in the art that numerous changes and modifications may be made therein without departing from the invention and it is therefore aimed in the appended claims to cover all such equivalent variations as fall within the true spirit and scope of the invention.

What I claim as new and desire to secure by Letters Patent of the United States is:

1. A method of fabricating an assembly that has a shaft and rotor core, and forming an adherent, hardened, film of magnesium hydroxide on a preselected portion of the shaft having finished journal surfaces for use in the dynamoelectric machine comprising the steps: applying a solution of magnesium methylate to the preselected portion of said shaft; forming said solution into an adherent, hardened, film of magnesium hydroxide, and assembling the shaft and the rotor core; and maintaining said film below the temperature of 350° centigrade at which magnesium oxide is formed to provide an adherent film for protecting the covered portions of the shaft against corrosion.

2. The method of fabricating an assembly that has a shaft and dynamoelectric machine rotor core, and forming an adherent, hardened film of magnesium hydroxide on the shaft having finished journal surfaces and at least one output side for use with the dynamoelectric machine rotor core comprising the steps of: applying a coating of magnesium methylate to the output end of said shaft and the shaft journals; forming said coating into an adherent, hardened film of magnesium hydroxide; and assembling said shaft and the rotor core while maintaining the temperature of said hardened film below 350° centigrade.

3. A method of fabricating a rotor and shaft assembly comprising the steps: immersing at least one end of a shaft having finished journals into a solution of magnesium methylate; withdrawing the shaft end from the solution at a rate of speed between 2 and 4 feet per minute to form an adherent, generally uniform coating on the portion of the shaft immersed in the solution; forming the coating into an adherent hardened film of magnesium hydroxide; assembling a pre-heated rotor core having an enlarged bore onto said shaft beyond said film; and cooling said core to reduce the size of the bore for frictional engagement with said shaft while concurrently maintaining the temperature of said hardened film below 350° centigrade.

4. The method of claim 1 in which the solution of magnesium methylate is applied by immersing the preselected portion of the shaft into magnesium methylate and the preselected shaft portion is withdrawn at a rate of speed generally within the range of 2 to 4 feet per minute at ambient temperature conditions whereby desired uniformity in solution thickness is attained on the preselected portion of the shaft.

References Cited
UNITED STATES PATENTS

| | | | |
|---|---|---|---|
| 2,305,093 | 12/1942 | Leflar et al. | 200—80 |
| 2,305,441 | 12/1942 | Pepper | 200—80 |
| 2,594,822 | 4/1952 | Stross | 252—25 |
| 2,646,824 | 7/1953 | Johnson | 29—149.5 X |
| 2,671,758 | 3/1954 | Vinogard | 252—25 |
| 2,715,586 | 8/1955 | Lawrence | 117—169 |
| 2,762,724 | 9/1956 | Bhennan | 117—127 |
| 2,934,480 | 4/1960 | Slomin | 29—458 X |
| 3,073,722 | 1/1963 | Hoehn | 117—127 |
| 3,099,083 | 7/1963 | De Long | 29—458 |
| 3,141,233 | 7/1964 | Schneider | 29—458 X |

CHARLIE T. MOON, *Primary Examiner.*